United States Patent [19]

Graf et al.

[11] 4,448,858

[45] May 15, 1984

[54] CHEMICALLY RECHARGEABLE BATTERY

[75] Inventors: James E. Graf, Arcadia; John J. Rowlette, Monrovia, both of Calif.

[73] Assignee: California Institute of Technology, Pasadena, Calif.

[21] Appl. No.: 476,318

[22] Filed: Mar. 17, 1983

Related U.S. Application Data

[63] Continuation-in-part of Ser. No. 362,087, Mar. 26, 1982.

[51] Int. Cl.³ .............................................. H01M 6/50
[52] U.S. Cl. ........................................ 429/49; 429/19; 429/27; 429/221
[58] Field of Search ........................ 429/49, 17, 19, 27, 429/50, 52, 221

[56] References Cited

U.S. PATENT DOCUMENTS

| | | | |
|---|---|---|---|
| 1,488,480 | 4/1924 | Edison | 429/49 |
| 1,488,481 | 4/1924 | Edison | 429/49 |
| 2,073,734 | 3/1937 | Downing | 429/49 |
| 3,847,671 | 11/1974 | Leparulo et al. | 429/15 |

*Primary Examiner*—Charles F. LeFevour
*Attorney, Agent, or Firm*—Marvin E. Jacobs

[57] ABSTRACT

Batteries (50) containing oxidized, discharged metal electrodes such as an iron-air battery are charged by removing and storing electrolyte in a reservoir (98), pumping fluid reductant such as formalin (aqueous formaldehyde) from a storage tank (106) into the battery in contact with the surfaces of the electrodes. After sufficient iron hydroxide has been reduced to iron, the spent reductant is drained, the electrodes rinsed with water from rinse tank (102) and then the electrolyte in the reservoir (106) is returned to the battery. The battery can be slowly electrically charged when in overnight storage but can be quickly charged in about 10 minutes by the chemical procedure of the invention.

10 Claims, 3 Drawing Figures

CHEMICALLY RECHARGEABLE BATTERY

DESCRIPTION

Origin of the Invention

The invention described herein was made in the performance of work under a NASA contract and is subject to the provisions of Section 305 of the National Aeronautics and Space Act of 1958, Public Law 83-568 (72 Stat 435; 42 USC 2457).

CROSS REFERENCE TO RELATED APPLICATION

This application is a continuation-in-part of Ser. No. 362,087, filed March 26, 1982.

TECHNICAL FIELD

The present invention relates to secondary metal-in-air, electrical storage batteries and, more particularly, to chemically regenerating an iron-air battery system.

BACKGROUND ART

As petroleum fuels continue to dwindle and alternate energy sources continue to develop, the demand for economic, high performance batteries will continue to grow. The applications for these batteries will be varied and include utility load leveling, military and commercial standby power, and energy storage for electric vehicles. Although the present state-of-art batteries and those presently under development (such as the bipolar lead-acid) should meet most of the demands of these applications, one application will be sorely lacking. An energy storage system for a "first" or only electric vehicle family is not under development. The characteristics of such a system are a large energy density and a rapid, easily accomplished recharge. These qualities will enable the electric vehicle to free itself from its range limitations and compete directly with the internal combustion engine (ICE) powered vehicle. Thus far, no battery design has overcome this range limitation economically.

One design, the aluminum-air battery, can provide the range but is uneconomical and so physically voluminous that it is impractical for a vehicle. On the other hand, the lead-acid design is economical but suffers from a low energy density and impractical fast recharges due to the high electrical power levels needed. Other battery types are unacceptable since they suffer from poor economics or the high power levels during fast recharge or both.

The iron-air battery has the potential to overcome both the economic and recharge problems. The iron-air battery, as it is presently configured, is constructed of materials found readily, easily, and cheaply in the U.S. In particular, the air electrode design has been constrained to be economic. It does not use platinum as do most air electrodes (such as that found in the aluminum-air battery), but uses only small amounts of silver. The battery has a relatively high energy density ($\sim$100 Wh/kg), moderate power density ($\sim$90 Wh/kg) when compared to other near-term and advanced batteries. Its cells have achieved 300 cycles at 80% DOD. However, this battery has fairly low electrical charge efficiency (55%) and, as in all electrically recharged batteries, a long recharge time.

In order to satisfy the need for a single family vehicle, the vehicle must be capable of both short distance and long distance uses. Iron-air batteries can provide energy for local driving and for moderate highway trips up to 150 miles. To travel farther, one must perform a slow electrical recharge of about eight hours, a rapid one hour electrical recharge or replace the iron plates. The slow electrical charge is the standard procedure utilized to recharge iron-air batteries but results in unacceptably slow average trip speed. The rapid one hour electrical recharge requires enormous electrical power levels. Replacement of the plates has not been demonstrated and would require about 300 kg of iron to be exchanged in the battery and stored. This would require a vast network of stations storing the plates and it is not a practical system.

SUMMARY OF THE INVENTION

A method of rapidly and conveniently recharging secondary metal-air batteries is provided in accordance with the invention. The battery can be rapidly recharged in the middle of a trip removing one of the major limitations for the use of this type of battery in an electric vehicle for family use. The quick recharge method of the invention can supplement the slow electrical recharge method which still can be used overnight when the vehicle is stored at home, at a hotel, or final destination of the family trip. The ability to provide a rapid, non-electrical recharge of a battery within about 10 minutes would result in provision of an electric vehicle competitive in performance and cost with an internal combustion engine vehicle and yet free from pollutants and also freeing the economy and the nation from dependence on the importation of foreign petroleum.

Recharging is accomplished in accordance with the invention by removing the electrolyte and flowing a fluid through the electrode chambers in contact with the discharged iron electrode that is capable of reducing the $Fe(OH)_2$ to pure iron. This is the same reduction that occurs during electrochemical recharging. The fluid can be either a gaseous or liquid reducing agent. A representative gaseous reducing agent is hydrogen while liquid reductant solutions can be formulated from any compound having a standard reduction potential ($E°$) greater than about 0.049 V.

Representative solutions are formaldehyde (HCHO), sodium monohydrogen phosphite ($Na_2HPO_3$), sodium hypophosphite ($NaH_2PO_2$) and sodium dithionite ($Na_2S_2O_4$). The sodium monophosphite undergoes a two-stage reduction forming sodium monohydrogen phosphite in the first stage which is capable of further reduction to phosphite ion. The actual reduction reaction and their potentials are listed below:

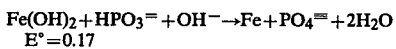
$Fe(OH)_2 + HPO_3^= + OH^- \rightarrow Fe + PO_4^{\equiv} + 2H_2O$
$E° = 0.17$

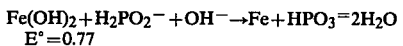
$Fe(OH)_2 + H_2PO_2^- + OH^- \rightarrow Fe + HPO_3^= 2H_2O$
$E° = 0.77$

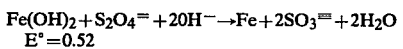
$Fe(OH)_2 + S_2O_4^= + 2OH^- \rightarrow Fe + 2SO_3^= + 2H_2O$
$E° = 0.52$

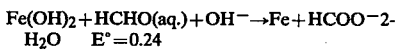
$Fe(OH)_2 + HCHO(aq.) + OH^- \rightarrow Fe + HCOO^- - 2 H_2O \quad E° = 0.24$ The use of aqueous systems introduces a competing reaction. The reduction of water is a slightly more favorable reaction than the recharging reaction. This is avoided by utilizing a non-aqueous solvent, preferably polar organic solvents such as lower alkanols of 1 to 5 carbon atoms or other polar, high dielectric solvents such as dimethyl formamide, dimethyl sulfoxide or N-methyl pyrollidones. Methanol is in itself a reducing agent and is the lowest priced polar organic solvent. Other reducing agents such as the formaldehyde may be dissolved in the solvent in amounts from 10% to 60% by weight. The reduction reaction is accelerated in rate and more iron oxide on the electrode is reduced by conducting the reaction at higher temperature from 20° C. to 120° C., preferably from 50° C. to 90° C. and/or by applying a small external bias of 0.1 to 1.0 V to the iron electrode utilizing an inert counterelectrode preferably of a metal that is a catalyst for the electrochemical dissociation of water such as platinum or palladium or their alloys with other metals such as nickel, copper, etc. Aqueous formaldehyde or paraformaldehyde are unstable and evolve noxious odors when heated. However, basic methanol solutions of formaldehyde and paraformaldehyde even at high concentrations are stable at temperature $<40°$ C.

Conducting the reaction under basic conditions such as from 0.1 M to 6 M alkali metal hydroxide or lower alkoxide such as methoxide further accelerates the reduction reaction and also aids in removing formate and carbonate reaction products. The reduction reaction under basic conditions is illustrated below:

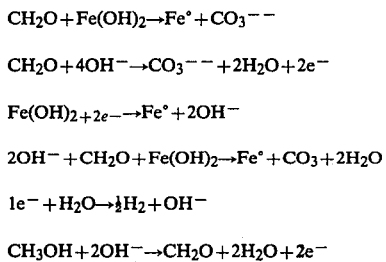

Even though the chemical reduction reaction is a surface reaction, formation of an impervious layer of iron encapsulating a non-conducting, non-reacting layer of $Fe(OH)_2$ is not expected due to the very thin layer of oxidation. Furthermore, the iron electrodes are formulated as a composite composed of sintered iron particles of about 0.1 to 0.2 $\mu m$ in diameter. In the full charged state, all particles are pure metallic iron. However, when the plate is completely discharged only about 40% of the iron has been oxidized to $Fe(OH)_2$ with the remainder of the iron remaining in metallic form in order to maintain mechanical strength and electrical conductivity. Thus, only the outer 16% in thickness or radius of the iron particles is involved in the oxidation-reduction processes. Thus, the iron hydroxide films are extremely thin and an insulation layer of $Fe(OH)_2$ is not expected to appear. If such a layer does form, a short electrical charge can be practiced before the chemical reductant is added to the cell since electrical charge reduction operates from the inside toward the outside and will reduce the layer.

An electric vehicle powered with the metal-air secondary battery system in accordance with the invention could potentially serve all the vehicle needs of a family. Such a vehicle would have an initial range of 240 km (150 mi.) on one charge. Its acceleration abilities can be comparable with those of today's internal combustion engine (ICE) vehicles. Upon completion of a normal day's driving either the conventional electrical or the fast chemical recharge of the invention can be utilized. The traditional electric means can be used for long 6 to 8 hour overnight charge or the fast chemical means could be employed for a 10 minute charge. The chemical charge could also be utilized on long trips similar to refueling at a gas station with today's vehicles.

The chemical charge can be practiced by draining and storing the battery electrolyte; filling the battery with the chemical reducing fluid and maintaining the fluid in the battery compartments until the reduction reaction is at or near completion; draining the spent fluid; optionally flushing the battery compartments with a rinse solution and then refilling the battery with the electrolyte. The spent reduction fluid can be discarded or regenerated by oxidation back to its original reducing form. Economic analysis has indicated that the cost of chemical reductant can be less than 7 cents per mile. Thus, an electric vehicle powered with the system of the invention could economically handle virtually all the daily and vacation driving needs of a typical driver and also provide the versatility of recharging either slowly via the electrical means, or rapidly via the chemical means. The new versatile energy storage system of the invention may also be used for powering portable equipment which would be returned to a chemical charging station for a fast recharge. The batteries can also be used in the field for construction or military applications or for powering field communications and other remotely located electronic systems. It is believed that the rechargeable metal-air battery system of the invention that is capable of chemical and electrical recharging would provide a significant advance toward development of a commercial electric vehicle that would have the economics and performance necessary to compete with an internal combustion vehicle.

These and many other features and attendance advantages of the invention will become apparent as the invention becomes better understood by reference to the following detailed description when considered in conjunction with the accompanying drawings.

DETAILED DESCRIPTION OF THE INVENTION

Figure 1:
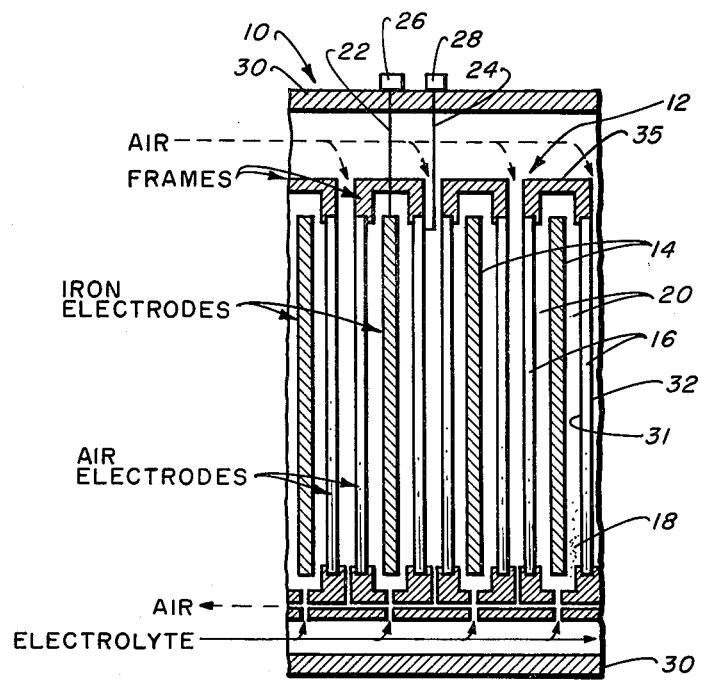
FIG. 1 is a schematic view of a metal-air battery.

Referring now to FIG. 1, the metal-air battery 10 is composed of cells 12, each containing an active negative metal electrode 14 and a depolarizing gas electrode 16. Electrolyte 18 is disposed in the chamber 20 formed between the metal electrode 14 and the gas electrode 16. The electrolyte can be stationary or recirculated through the chamber(s) 20. As oxidizing gas such as air or chlorine flows past the gas electode(s) 16, an electric potential is generated. Conductors 22, 24 connect the electrodes 14, 16 to the terminals 26, 28 mounted on the battery case 30.

The battery and its component cells may assume many configurations and can be formed of many different compositions. The metal of choice appears to be iron and the preferred oxidizing gas is air. It also forms a very rugged, long-life battery having high energy density. The iron is utilized in fixed form rather than being suspended as particles in the electrolyte.

Since the negative electrode can limit the total energy of the system, the iron electrode is preferably fairly thick (1-5 mm), conducting and of a porous structure to permit expansion during discharge. Sintered iron electrodes having high capacities have been developed from very cheap iron.

The gas electrode can be rechargeable or an auxiliary electrode can be provided for evolving oxygen during charge. The dual function gas electrode requires two layers; a hydrophilic layer 31 with good current conducting properties facing the electrolyte chamber 20 and a hydrophobic coarse layer 32 containing the catalyst on the air side. A suitable electrode can be formed of sintered nickel plaque, 0.6 mm thick with silver catalyst disposed in the coarse layer.

The electrodes may be fabricated into modular pockets by forming an envelope of two air electrodes containing a central iron electrode. The air electrodes may be welded to a polymer frame 35 to form a compact pile. A suggested low volume battery configuration contains 8 piles each consisting of 190 air and 95 iron electrodes. The electrodes of each pile are divided into 19 cells connected in series. The size of the electrodes is about 10×20 cm.

The battery is preferably utilized with auxiliary air and electrolyte subsystems. Maintaining the air under a slight differential pressure will decrease the power required to pump the air through the system and also lower the demand on strength and stability of the stack construction and electrodes. It is also advisable to remove $CO_2$ from the air to avoid reaction with the electrolyte. Moisture added to the air will prevent dehydration of the electrolyte. The exothermic reaction produces heat which must be removed to achieve long service life for the electrodes and other components. This is accomplished by circulating the electrolyte through an external heat exchanger. This circuit can also contain filters and $CO_2$ scrubbing elements. The chemical recharging system of the invention can readily be integrated into the electrolyte recirculating system.

Figure 3:
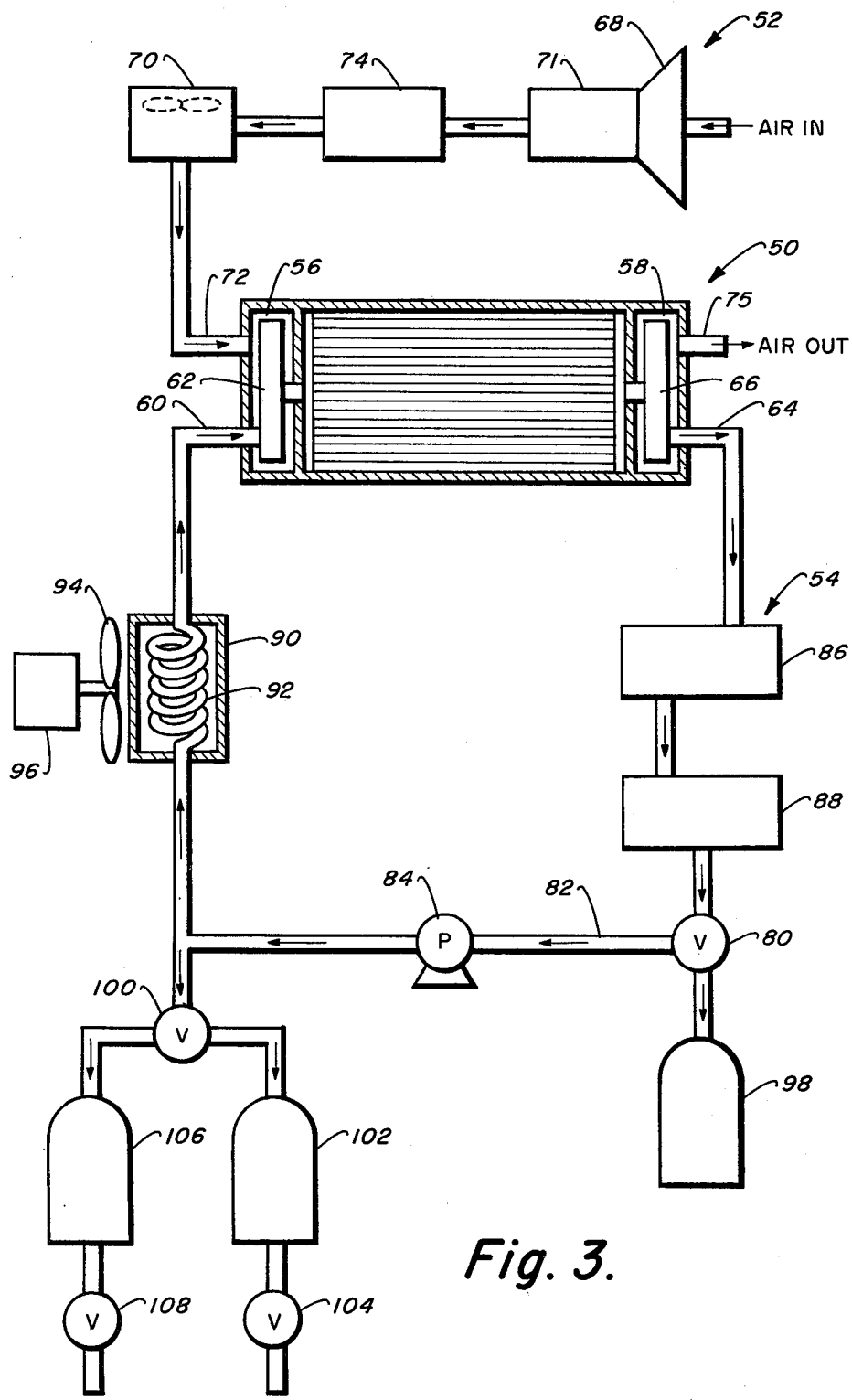
FIG. 3 is a schematic view of the chemical battery recharging system of this invention.

Referring now to FIG. 3, the battery system of the invention comprises a metal-air battery 50 having an air subsystem 52 and an auxiliary electrolyte subsystem 54. The battery contains a plurality of air electrodes connecting to an inlet manifold 56 and an outlet manifold 58. Similarly, the electrolyte inlet 60 is connected to an inlet manifold 62 and the electrolyte outlet 64 is connected to an outlet manifold 66. The air subsystem comprises an inlet funnel 68 connected to a fan 70, which blows the air through a filter 71 and scrubber-humidifier 74 before delivering the air to inlet 72. The air distributes throughout manifold 56 and into the various air passages between the air electrodes, not shown, and collects in manifold 58 before leaving through outlet 75.

In the electrolyte circulating subsystem 54, the electrolyte collects in the outlet manifold 66 and leaves the battery through outlet 64. When three-way valve 80 is positioned toward line 82, the pump 84 pumps the liquid in turn through filter 86, $CO_2$-scrubber 88 and heat exchanger 90 before returning the electrolyte through inlet 60 into the inlet manifold 62. The electrolyte will then flow through the various cells and collect in outlet manifold 66. The cooler-heat exchanger 90 operates by drawing air past coils 92 by means of a fan 94 powered by motor 96.

During a recharge cycle, three-way valve 80 will be turned toward electrolyte reservoir 98 and pump 84 will pump the electrolyte into reservoir 98. Valve 80 is then turned toward line 82 and valve 100 is turned toward reductant tank 102, reductant is pumped into the battery into contact with all the surfaces of the iron electrodes to convert iron hydroxides to iron. Valve 100 is then turned toward reductant tank and the spent reductant is returned to tank 102 and valve 104 can be opened to drain and then refill tank 102 with reductant for the next recharging cycle.

Three-way valve 100 is then turned toward the rinse tank 106 and pump 84 pumps the rinse solution through the battery and back into rinse tank 106. Valve 108 can then be opened to drain the rinse solution and to refill tank 106 with fresh solution for the next cycle. Valve 100 is then closed. Valve 80 is turned toward line 82 and electrolyte is pumped back through the battery. The battery is now ready for further operation when air flow is initiated by turning on fan 70.

Figure 2:
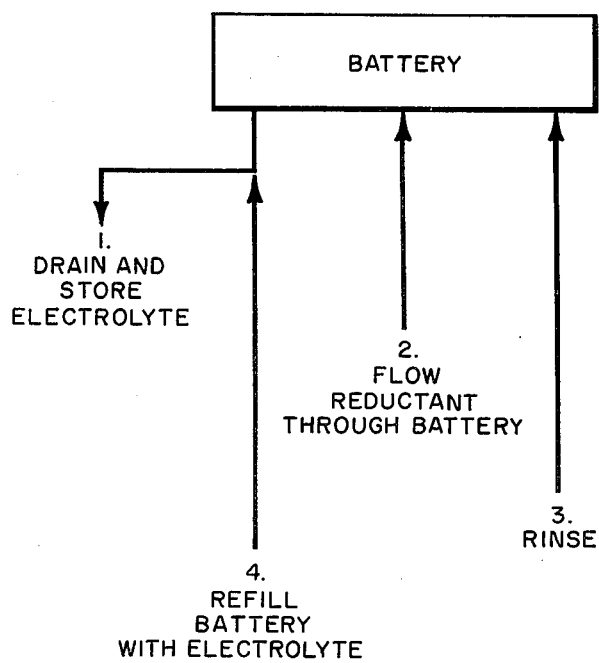
FIG. 2 is a process flow schedule for recharging a metal-air battery in accordance with this invention.

As shown in FIG. 2, the chemical charge cycle includes the steps of (1) removing electrolyte, (2) flowing reducing agent in contact with the oxidized surfaces of the metal electrodes for a time sufficient for the reduction reaction to occur. The reductant may be in static contact with the electrode surfaces or the battery can be vibrated or shaken during reduction reaction or the reductant can be circulated through the cells. The reductant is then drained, the surfaces of the electrodes (3) flushed with a rinse such as distilled water and then the battery is (4) refilled with electrolyte.

In a first series of experiments various reducing agents with reduction potentials cathodic of the Fe(OH)$_2$/Fe couple were tested for their ability to directly reduce Fe(OH)$_2$ powder in basic aqueous and methanol solutions under nitrogen gas at temperatures from 20° C. to 100° C. The results are presented in the following table:

TABLE 1

| SOLUTION | REDUCTION OF Fe(OH)$_2$(UNDER N$_2$) | |
|---|---|---|
| | TEMPERATURE | RESULT |
| Na$_2$H$_2$PO$_2$.H$_2$O/KOH/MeOH | 60° C. | Black, Magnetic PPT. |
| KOH/MeOH | 75° C. | Black, Magnetic PPT. |
| NaOCH$_3$/MeOH | 60° C. | Black, Magnetic PPT. |
| Na$_2$H$_2$PO$_2$.H$_2$O/NaOCH$_3$/MeOH | 60° C. | Black, Magnetic PPT. |
| Na$_2$H$_2$PO$_2$.H$_2$O/KOH/H$_2$O | | No Reaction to ~100° C. |
| Na$_2$S$_2$O$_4$/KOH/H$_2$O | | No Reaction to ~100° C. |

Black magnetic precipitates were obtained in basic methanol solution with or without additional reducing agents at reaction temperatures above 60° C. These precipitates readily turned reddish brown upon exposure to air and were identified as iron.

The second group of experiments involved immersing fully discharged iron electrodes in basic methanol solutions at elevated temperature with and without additional reducing agents. Results follow:

TABLE 2
REDUCTION OF DISCHARGED IRON ELECTRODES

| SOLUTION | TEMPERATURE | RESULT |
|---|---|---|
| $NaOCH_3/MeOH$ | 70° C. | Small Recharge Effect |
| $Na_2H_2PO_2.H_2O/KOH/MeOH$ | 85° C. | Small (~1-2%) Recharge |
| $KOH/MeOH$ | 90° C. | Minor Recharge Effect |

Though no significant recharge occurred at room temperature with these solutions, fractional recharge did occur at temperatures of 60°-80° C. with 4 Molar potassium hydroxide in methanol (4 M KOH/MeOH) and several other basic alcohol reducing agents. Voltammetric studies showed that the potentials for methanol oxidation on iron, and iron electrode recharge overlapped to some degree in the potential region $-0.8 + -0.6$ Volt vs. the mercury/mercuric oxide reference electrode (Hg/HgO). Platinum, nickel, and silver electrodes also showed catalytic activity for electro-oxidation of methanol; Pt was superior to Fe, Ni, or Ag. Since only small degrees of recharge could be obtained by direct reduction of discharged iron electrodes, due to the passivating effect of the iron oxide/hydroxide film it appeared that an electro-chemically driven-recharge process (in which methanol or some other reducing agent is electro-oxidized at a catalytic counter electrode to provide the driving force for electro-reduction of the discharged iron electrode) might provide more effective chemical recharge. External electric power input might still be minimized or reduced to zero.

The system of the invention is particularly useful with the iron air-battery systems which can be readily recharged via the simple and quick chemical technique. The iron-air battery has a high energy density and a relatively long cycle life. The recharge can be accomplished in a very short time in the order of five to fifteen minutes which will provide good average trip speed and makes possible an energy storage unit for a viable competitive electric or hybrid vehicle. The two major weaknesses of an electric vehicle, which are long recharge time and limited range, can be overcome by the chemically-rechargeable, iron-air battery system of the invention. The recharge technique appears to be both energy efficient and economically attractive while the iron-air battery materials are relatively inexpensive and available. This combination should lead to a viable electric vehicle and a transportation system free from petroleum imports and pollution. Further economics may be achieved by regenerating the reductive solution.

The economics appear very favorable with formaldehyde. An estimated 7.3 gallons of formalin will be needed to recharge a 100 mile range vehicle. Formalin is an aqueous solution which contains 37 by weight of formaldehyde (formaldehyde being a gas at room temperature). In large quantities, the formalin would cost about $7.00 per recharge (100 miles) or very competitive 7 cents per mile. In summary, an iron-air powered vehicle would handle economically virtually all the daily commuting, shopping and vacation driving needs of a typical family and the battery could be recharged either slowly via electrical recharging means or rapidly via the chemical means of the invention.

The electrical storage system of the storage system of the invention is also useful in remote areas where sources of electrical energy for recharge are not available and for military installations or field use since use of heat emitting generators, which are easily identified with infra-red detectors, are avoided.

It is to be realized that only preferred embodiments of the invention have been described but that numerous substitutions, alterations and modifications are all permissible without departing from the spirit and scope of the invention as defined in the following claims.

We claim:

1. A system for recharging a metal-oxidant gas battery having an electrolyte inlet and an electrolyte outlet comprising:
   a fluid circuit for connection to said inlet and outlet containing:
   electrolyte storage means;
   reservoir means containing a supply of fluid reducing agent;
   pump means for flowing the electrolyte into and out of the battery and for flowing the fluid reducing agent through the battery in contact with the surfaces of oxidized, discharged electrodes; and
   valve means for sequentially flowing said reducing agent into the battery and when spent from the battery, for removing electrolyte from and for refilling the battery with electrolyte.

2. A system according to claim 1 in which the reducing fluid is an aqueous solution of a reducing agent having a standard reduction potential greater than 0.049 V.

3. A system according to claim 2 in which the reducing agent is selected from formaldehyde, monohydrogen phosphite, a hypophosphite, or a dithionite.

4. A system according to claim 3 in which the reducing agent is formaldehyde.

5. A system according to claim 1 in which the battery is an iron-air battery.

6. A system according to claim 1 in which the metal is iron.

7. A system according to claim 6 in which the oxidant gas is air.

8. A system according to claim 1 in which the circuit further includes a source of rinsing liquid.

9. A system according to claim 1 in which the valve means selectively connects the electrolyte outlet to the fluid reducing agent reservoir.

10. A system according to claim 9 in which the reservoir further includes a drain for removing spent agent and means for filling the reservoir with a charge of fresh reducing agent.

* * * * *